United States Patent [19]

Chorney

[11] Patent Number: 4,489,950
[45] Date of Patent: Dec. 25, 1984

[54] FERROFLUID-POLE-PIECE-MAGNET APPARATUS

[75] Inventor: Alvan F. Chorney, Sharon, Mass.

[73] Assignee: Ferrofluidics Corporation, Nashua, N.H.

[21] Appl. No.: 497,856

[22] Filed: May 25, 1983

[51] Int. Cl.³ .............................................. F16J 15/40
[52] U.S. Cl. ...................................... 277/80; 277/234
[58] Field of Search .................... 277/1, 80, 227, 233, 277/234

[56] References Cited

U.S. PATENT DOCUMENTS

| | | | |
|---|---|---|---|
| 3,740,060 | 6/1973 | Miskolczy et al. | 277/80 |
| 3,756,279 | 9/1973 | Widmaier | 277/233 |
| 3,788,650 | 1/1974 | Place | 277/80 |
| 4,240,228 | 12/1980 | Okamura | 277/80 |
| 4,252,328 | 2/1981 | Raj et al. | 277/80 |
| 4,357,021 | 11/1982 | Raj et al. | 277/80 |
| 4,406,467 | 9/1983 | Burger et al. | 277/234 |

Primary Examiner—Robert I. Smith
Attorney, Agent, or Firm—Richard P. Crowley

[57] ABSTRACT

Pole-piece-magnet apparatus for use as single- or double-pole-piece ferrofluid seal apparatus and method of manufacture, which pole-piece-magnet apparatus comprises at least one washer-type metal-pole-piece element with one flat surface having a plurality of spaced-apart raised dimple elements thereon with outwardly extending anchoring surfaces; and a washer-like hard molded permanent magnet polymer ring element molded about and secured directly to the one flat surface of the pole-piece element by the anchoring surface on the raised dimples, the permanent magnet ring element having an inner diameter greater than the inner diameter of the pole-piece element and an outer diameter of about the same dimensions as the outer diameter of the pole-piece element.

10 Claims, 5 Drawing Figures

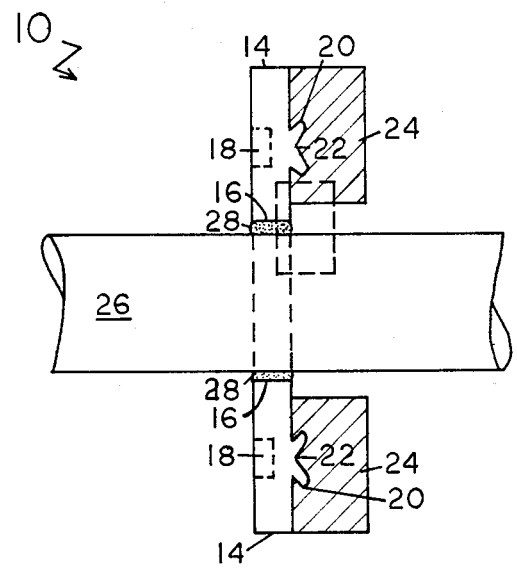
FIG. 3
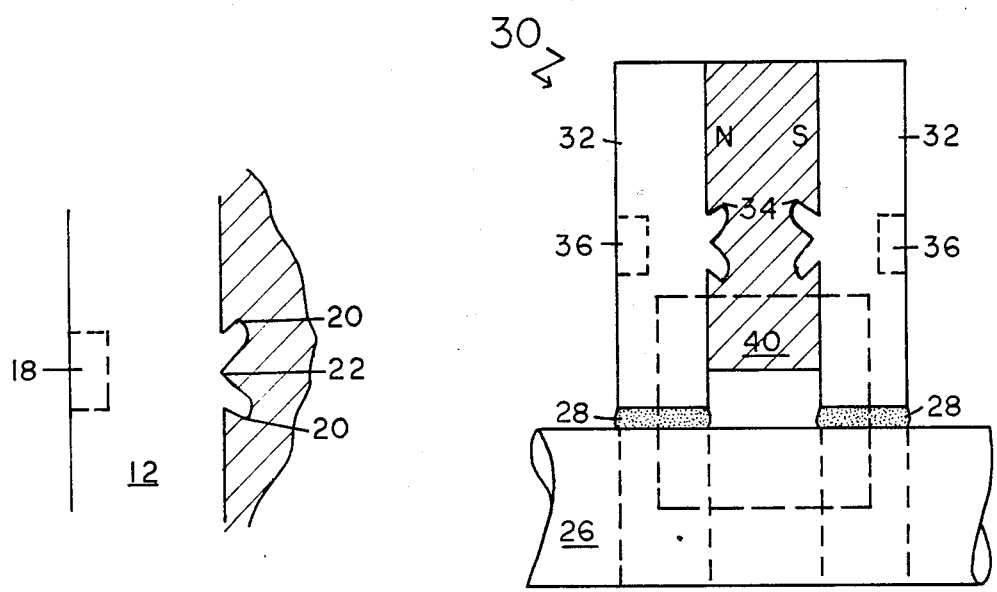
FIG. 4
FIG. 5

FERROFLUID-POLE-PIECE-MAGNET APPARATUS

REFERENCE TO PRIOR APPLICATION

This application is an improvement in the single-pole-piece ferrofluid seal apparatus and the method of manufacturing the single-pole-piece-magnet apparatus used in the seal apparatus as described in U.S. patent application Ser. No. 450,339, filed Dec. 16, 1982, entitled "Single-Pole-Piece Ferrofluid Seal Apparatus and Exclusion Seal System" by Kuldip Raj and Raoul Casciari, the disclosure of which is incorporated by reference herein.

BACKGROUND OF THE INVENTION

Single, dual, and multiple pole piece ferrofluid seal-type apparatus are known and are designed to provide a ferrofluid seal about a moving element, such as a rotatable shaft element, either as an exclusion-type single or dual pole piece seal or as a pressure-type multiple-stage seal.

In single pole piece-permanent magnet ferrofluid seal apparatus of the type disclosed in U.S. Ser. No. 450,339, as well as in other seal apparatus, the washer-like pole piece element is secured to the annular permanent magnet by staking the elements together or more commonly by bonding the flat opposing surface of the pole piece element and the permanent magnet together employing a high strength adhesive material.

It is however desireable to provide a simple, rapid, low cost and yet effective method for the manufacture of a single or dual pole piece-permanent magnet apparatus and to provide an improved single and dual pole piece ferrofluid seal apparatus, which method and apparatus overcome certain disadvantages of prior art methods and apparatus and provide new and improved advantages.

SUMMARY OF THE INVENTION

The invention relates to an improved single pole piece ferrofluid seal-magnet apparatus and to the pole piece-permanent magnet used in the seal, and to a method of manufacturing the single-pole-piece magnet combination used in ferrofluid-type seal apparatus. In particular, the invention concerns the method of attaching one surface of a single- or dual-pole piece to a molded polymeric permanent magnet.

A method of manufacturing a pole-piece element-permanent magnet combination has been discovered which method avoids the use of high strength adhesives and yet provides a simple, rapid, low cost, direct bonding of one face surface of a washer-type pole-piece element directly into intimate bonding contact with a permanent magnet. The pole piece-permanent magnet combination apparatus so prepared is useful in a single-pole-piece-magnet ferrofluid seal, i.e., single-stage seals, or in the preparation of dual or multiple-stage ferrofluid seals.

The method comprises striking the one surface of a selected magnetically permeable typically metal, thin, pressure-deformable sheet material with a die element such as in a coining operation to form a plurality of spaced-apart, generally peripherally formed indentations in the sheet material and to form raised projections or corresponding raised dimple elements on the opposite side of the sheet material by the coining or die striking operation.

The sheet material used may comprise any magnetically-permeable-type deformable material suitable for use as a pole piece element in a ferrofluid seal apparatus. Generally the sheet material is a metal sheet material such as a stainless sheet. The sheet material may vary in thickness, but may, for example, in small single-stage-ferrofluid seals range from about 1/64" to 1/16" in thickness. It is preferred that the sheet material be selected to have sufficient hardness to be deformable in the die operation and in the subsequent die cutting operation. It has been found for example that sheet material of about ¼ hard stainless steel or slightly softer metal sheet material is suitable for the purpose of the invention. The softness-hardness of the sheet material is selected to provide acceptable raised dimples and indentations and also to form the desired amount of overhang or swaging during the subsequent spanking operation to form an anchoring means for the permanent magnet material.

The die striking of the solid sheet material may be accomplished with a single or multiple pin-like die element to form generally annular or other shaped indentations of defined depth in the sheet material, e.g., about 10 to 50% of the sheet material thickness. The plurality of indentations may be formed in one or multiple striking operations. It is preferred that the forming of indentations and the raised dimples be carried out prior to cutting or removing any washer-like pole-piece elements from the sheet material to avoid deformation of the washer-shaped sheet material.

After or with formation of the indentations and dimples in the sheet material, the surface of raised dimple elements is then struck to force outwardly the deformable material from the outer periphery of the raised dimple element in a spanking operation to provide an anchoring means for the subsequent molding and bonding of the permanent magnet material to this side of the pole piece material. For example, the raised surface of the dimple element is struck with a bar of knife-like die element across the center of the surface to splay outwardly the material on each side forming a elliptical V-like shape with the splayed dimple element material extending at a low angle to the surface of the sheet material and importantly extending beyond, i.e., overhanging the underlying sheet material of the raised dimple element. In the spanking operation it is desireable to prevent the downward movement of the raised dimple elements into the indentations and thus the pin die element after the die striking of the indentation may be held in place, while the spanking operation carried out on the opposite side of the sheet material. The in-place die element prevents the further inward movement of the raised dimple element and provides solid suport for the spanking operation. A variety of spanking or other pressure-type operations may be used to provide an anchoring means on the raised dimple element surface. The amount, form, nature and extent of the spanking operation and the splaying of the material may vary as desired to provide the necessary material overhang.

After die striking and spanking, the desired pole-piece element is removed from the sheet material, typically in a die-cutting operation to provide a washer- or other type pole-piece element of defined inner and outer diameter and dimensions as required for the particular shaft and ferrofluid seal appartus. Optionally, the washer pole-piece element may be plated, such as nickel plated, to reduce corrosion or other operation carried out, for example, degreasing, corrosion treatments, deburring and the like. The washer pole-piece element is cut from the sheet material generally to provide for a plurality of uniformly spaced-apart indentations on one flat washer surface and splayed raised dimple elements on the other flat washer surface, such as, at least two and generally three to four or more, anchoring means to provide proper and secure bonding of the permanent magnet.

The washer pole-piece element is then directly bonded to a polymeric moldable magnetic material by molding or otherwise forming the polymeric material in direct contact with the flat surface of the pole piece containing the anchoring means thereon. In one method, the pole-piece element is placed in an injection mold cavity and the polymeric magnetic material is injection molded under heat and high pressure into the mold cavity and against the surface of the pole piece with the anchoring means to form an annular washer-type permanent magnet element having generally an outer diameter the same or similar to the outer diameter of the pole piece element and an inner diameter slightly greater than the inner diameter of the pole piece element. The injected molded polymer material is molded about and under the anchoring mean surface and provides a direct, close direct bond with the flat surface of the pole-piece element. This technique provides for a secure bond and avoids the problems associated withthe use of too much or too little adhesive, is a cleaner operation than the use of glue or adhesives, provides a close and more effective bond without any gap through which ferrofluid might escape and reduces the amount of and errors associated with manual-type adhesive operations.

Where a dual stage or dual pole piece-magnet combination is desired, then two pole pieces may be placed in the mold and the polymeric material injected between the pole pieces to secure each pole piece to the molded magnet material.

Any moldable or formable polymeric magnetic material may be employed to form the hard molded permanent washer magnet. Generally, the polymeric material comprises an engineering-type moldable resin particularly a thermoplastic material capable of being injection molded in single or multiple cavity molds or an elastomeric magnetic cureable material. Typically the polymer material contains high amounts of finely divided magnetic particles like iron or iron oxides dispersed therein to provide for the desired magnetic properties. The polymeric material is often employed in pellet, powder or granular form and is used alone or in combination with additives or reinforcing material such as glass fibers and spheres, silica, metal oxides, carbon fibers and particles or other fiber and particulate materials. In use the polymeric material is heated, e.g., to over 200° C., and then in a melt or semi-melt condition forced, i.e., injected under high pressure, e.g., over 500 psig, into the mold cavity and then allowed to cool or react in situ and the molded hard injection molded piece then removed.

In one embodiment it has been found that a commercially available polyamide magnetic material, i.e., a magnetic nylon resin sold by 3M Company under the designations PLASTIFORM B-1055 and B-1060 having a gauss of 265 and a B-H curve maximum of $1.7 \times 10^{-6}$ gauss-oersted and containing magnetic particles is a suitable material for injection molding and forming the bonded pole-piece-nylon permanent magnet combination. Nylon resin, thermoplastic engineering-type resins, thermoset resins and elastomers can also be used. Nylon resins based on condensation or addition reactions generally have a melting point of 200°–300° C. or higher, and well known for use in injection molding techniques; however, other injection molding type resins containing magnetic properties may be used, such as having over 250 gauss.

The pole piece-molded-magnet combination apparatus of the invention is employed typically within a nonmagnetic housing as a single-stage ferrofluid seal apparatus with the use of a high gauss ferrofluid and the insertion of a magnetically permeable shaft element. The flux flow path is through the ferrofluid in a radial gap and through an air gap to the molded magnet.

For the purposes of illustration only, the invention will be described in connection with certain embodiments; however, it is recognized that certain changes, additions and modifications may be made of the illustrated embodiments all falling within the spirit and scope of the invention.

BRIEF DESCRIPTION OF THE DRAWINGS

FIG. 3 is a sectional view of a ferrofluid single-pole-piece molded magnet seal apparatus;

FIG. 4 is an enlarged, sectional, fragmentary view of a portion of FIG. 3; and

FIG. 5 is a sectional view of the upper half of a ferrofluid dual-pole-piece molded magnet seal apparatus.

DESCRIPTION OF THE EMBODIMENTS

Figure 1:
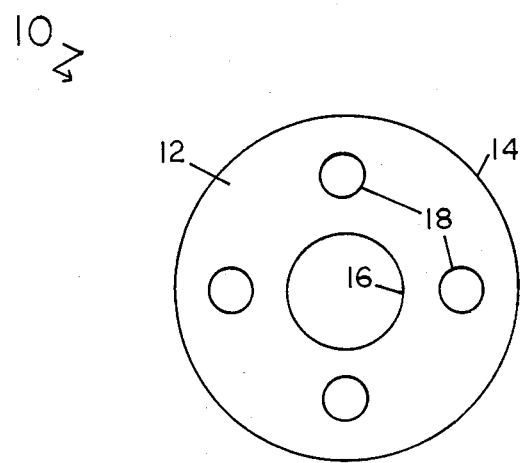
FIG. 1 is a plan view of one side of a pole-piece element.

FIG. 1 is a top plan view of a metal stainless steel nickel plated washer pole piece 12 having an outer diameter 14 and an inner diameter 16, the inner diameter designed to provide a radial gap of 1–6 mils about the surface of a magnetically permeable rotatable shaft element, used in the ferrofluid seal apparatus. The pole piece element 12 has four equal spaced-apart small circular indentations 18 therein caused by a multiple pin die striking the one surface of the element. The opposite surface of the sheet material contains before spanking similar cylindrical but raised dimple elements formed by the deformation of the sheet material.

Figure 2:
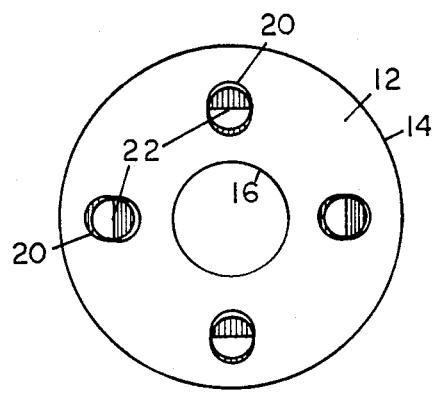
FIG. 2 is a plan view of the opposite side of the pole-piece element of FIG. 1.

FIG. 2 is bottom plan view of the opposite side of the pole piece element 12 of FIG. 1 showing a raised splayed dimple element 20 having an overhanging splayed surface as an anchoring means, the splayed surface extending at a low outward angle from the plane of the pole piece element 12. The splayed surface is formed by die striking the top surface of raised dimple element across the entire diameter 22 with sufficient pressure to deform the raised cylindrical stainless steel dimple sheet material, while the pin die element is held in position against the surface of the indentations.

FIG. 3 is a sectional view of a single pole piece single stage ferrofluid seal apparatus 10 with a rotatable shaft 26 extending through the inner diameter 16 of the single pole piece element 12 with a high gauss ferrofluid 28 in a radial gap and with the magnetic flux path shown in dotted lines for the upper position of the seal apparatus 10. The seal apparatus shows a hard molded magnetic nylon polymer 24 as the washer or annular permanent magnet of the seal apparatus, with the nylon about the splayed anchoring extensions 20 to retain and bond the nylon directly to the face of the pole piece 12.

FIG. 4 is a fragmentary enlarged schematic view of a portion of FIG. 3 showing the anchoring surface and splayed extension 20 with the center line 22 when struck by the spanking bar.

FIG. 5 is an illustration of a top portion of a dual pole piece dual stage ferrofluid seal wherein two washer metal pole pieces 32 are directly bonded to the washer nylon permanent magnet 40 therebetween by the splayed extensions 34 on the opposite side of indentations 36 of each pole piece. The magnetic flux is illustrated by the rectangular dotted line showing the flux passing through both ferrofluid O-ring seals 28 and with the extension of the ferrofluid seals on the surface schematically illustrated by parallel dotted lines extending from the ends of each pole piece.

Thus, the invention comprises employing mechanical anchoring means on at least one surface of a pole piece element and molding or otherwise forming a polymeric pressure magnetic material over and about the anchoring means typically in a molding operation to bond the polymeric material to the surface of the pole piece element and to the pole piece-magnet combination so produced.

What is claimed is:

1. A pole piece-magnetic apparatus for use in a ferrofluid seal apparatus which apparatus comprises:
   (a) a washer-like pole piece element composed of a magnetic permeable metal material having a defined inner and outer diameter and characterized by one surface having a plurality of spaced-apart indentations therein, and on the opposite surface a plurality of corresponding swaged raised dimple elements with an outwardly extending surface as an anchoring means; and
   (b) a permanent magnet washer-like ring element composed of a hard molded magnetic polymer material and having an inner diameter greater than the inner diameter of the pole piece element, the permanent magnet element directly secured to the opposite surface of the pole piece by molded polymer about the anchoring means on the pole piece.

2. The apparatus of claim 1 wherein the magnetic sheet material has a hardness of about that of ¼ hard cold-rolled stainless steel or slightly softer.

3. The apparatus of claim 1 wherein the moldable polymer material comprises a powdered injectable nylon polymer containing magnetic particles dispersed therein.

4. The apparatus of claim 1 wherein the plurality of indentations and corresponding swaged dimple elements aree generally uniformly spaced about the periphery of the washer-like pole piece.

5. The apparatus of claim 1 which includes a second washer-like pole piece element composed of a magnetic permeable metal material having a defined inner and outer diameter and characterized by one surface having a plurality of spaced-apart indentations therein, and on the opposite surface a plurality of corresponding swaged raised dimple elements with an outwardly extending surface as an anchoring means, wherein the permanent magnet washer-like ring element is directly bonded and secured to and between the opposite surfaces of the pole piece elements by the anchoring means on each opposite surface to provide a dual pole-piece permanent-magnet apparatus.

6. A ferrofluid single pole piece magnetic seal apparatus which comprises:
   (a) the single-pole-piece-magnet apparatus of claim 1;
   (b) a magnetically permeable shaft element extending through the inner diameter of the single-pole-piece to define a small radial gap between the surface of the shaft element and the inner diameter of the single-pole-piece element; and
   (c) a ferrofluid O-ring seal in the radial gap to provide a ferrofluid seal about the peripheral surface of the shaft element.

7. A pole piece-magnet seal apparatus for use as a ferrofluid seal apparatus which comprises:
   (a) a washer-type metal magnetically-permeable pole-piece element adapted to surround the surface of a shaft element to be sealed, the pole piece having one and an opposite surface and an inner and outer diameter, the inner diameter and the surface of the shaft forming a small radial gap for the retention of ferrofluid therein; the washer pole piece having an outwardly extending mechanical anchoring means on at least one surface thereof; and
   (b) a washer-type polymeric permanent magnet element having one and other surface and an inner and outer diameter and having at least one surface directly bonded to the one surface of the pole-piece element by the polymeric material extending about the anchoring means, the inner diameter of the permanent magnet element greater than the inner diameter of the pole-piece element.

8. The apparatus of claim 7 wherein the washer permanent magnet element comprises a magnetic hard-molded nylon resin.

9. The apparatus of claim 7 wherein the anchoring means comprises a plurality of uniformly spaced-apart angular splayed outwardly extending elements of the metal of the pole piece on the one surface thereof.

10. The appartus of claim 7 wherein the anchoring means comprises a pair of V-shaped metal anchoring elements integrally formed of the metal of the pole piece and extending angularly outwardly from the plane of one surface of the pole piece element.

* * * * *